United States Patent
Phelps et al.

(10) Patent No.: US 9,112,976 B2
(45) Date of Patent: Aug. 18, 2015

(54) PARKING AND ROUTING NETWORK CALLS AND SESSIONS

(75) Inventors: David E. Phelps, Colorado Springs, CO (US); Curtis E. Allen, Colorado Springs, CO (US); Frances D. E. Taylor, Falls Church, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1863 days.

(21) Appl. No.: 12/119,646

(22) Filed: May 13, 2008

(65) Prior Publication Data
US 2009/0285381 A1    Nov. 19, 2009

(51) Int. Cl.
| | |
|---|---|
| H04M 3/42 | (2006.01) |
| H04M 3/00 | (2006.01) |
| H04M 5/00 | (2006.01) |
| H04M 3/523 | (2006.01) |
| H04M 3/54 | (2006.01) |
| H04M 3/428 | (2006.01) |

(52) U.S. Cl.
CPC .............. *H04M 3/523* (2013.01); *H04M 3/428* (2013.01); *H04M 3/5232* (2013.01); *H04M 3/54* (2013.01)

(58) Field of Classification Search
CPC ...... H04M 3/54; H04M 3/523; H04M 3/5232
USPC ................ 370/352–356; 379/211.02, 212.01, 379/265.01, 265.02, 266.01, 266.02
See application file for complete search history.

(56) References Cited

U.S. PATENT DOCUMENTS

| | | | | |
|---|---|---|---|---|
| 5,506,898 | A  * | 4/1996 | Costantini et al. | 379/266.06 |
| 6,044,144 | A  * | 3/2000 | Becker et al. | 379/265.02 |
| 6,236,716 | B1 * | 5/2001 | Marcus et al. | 379/217.01 |
| 6,411,805 | B1 * | 6/2002 | Becker et al. | 379/209.01 |
| 6,570,980 | B1 * | 5/2003 | Baruch | 379/265.12 |
| 2005/0201533 | A1* | 9/2005 | Emam et al. | 379/88.19 |

* cited by examiner

*Primary Examiner* — Nafiz E Hoque (57) ABSTRACT

A device may process a call, receive a request to forward the call at a call extension point, obtain information about parked calls from a queue that stores information associated with the parked calls, determine whether the call may be parked or forwarded to a terminating device based on the information, park the call at the call extension point when it is determined that the call may not be forwarded, and forward the call to the terminating device when it is determined that the call may be forwarded.

19 Claims, 10 Drawing Sheets

PARKING AND ROUTING NETWORK CALLS AND SESSIONS

BACKGROUND

When a user calls a service (e.g., a toll-free number), an interactive/intelligent voice response (IVR) system may help the user navigate a Dual-Tone Multi-Frequency (DTMF) signal activated or voice-activated menu system. If a particular termination (e.g., a call handler) is unavailable, the call may be parked (e.g., put on hold) until the termination is able to handle the call.

DETAILED DESCRIPTION

The following detailed description refers to the accompanying drawings. The same reference numbers in different drawings may identify the same or similar elements. The terms a "call" or a "session," as used herein, may refer to a telephone call, a session initiation protocol (SIP) session (e.g., a voice-over-Internet-Protocol (VoIP) session, an instant text messaging session), and/or any other type of communication session. A session may include establishment of communication links between two or more endpoints, communication between the endpoints, and a termination of the communication links.

As used herein, the terms "routing a call," "extending a call," or "redirecting a call" may be used interchangeably, and may refer to forwarding the call.

In the descriptions that follow, a system may park calls and/or tracks calls at particular terminations. Depending on the number of calls that are being handled at each termination, the system may extend (i.e., connect callers to different endpoints) the parked calls to different terminations. Because the system may track parked calls and/or calls at particular terminations, the system may provide significant control over how and/or when a new call may be extended and/or parked.

For example, through a client interface (e.g., a web interface), information about terminations and/or calls may be accessed displayed in real time.

The system may be scalable, as additional components can be added to the system to handle increasing number of calls, and the system may be easily integrated with a toll free system or an intelligent voice response order entry system.

Figure 1:
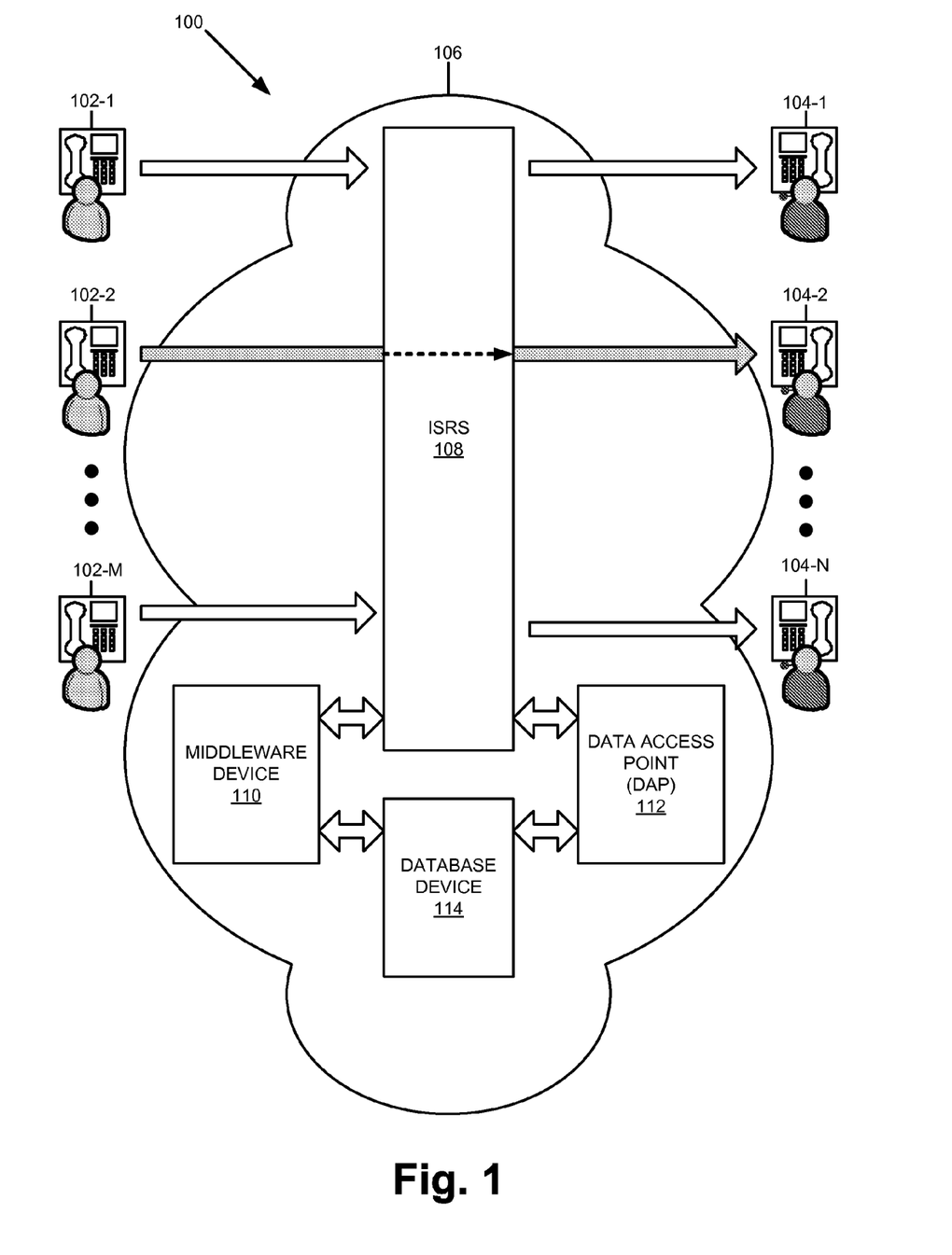
FIG. 1 is a diagram of an exemplary network in which concepts described herein may be implemented.

FIG. 1 is a diagram of an exemplary network 100 in which concepts described herein may be implemented. As shown, network 100 may include callers 102-1 through 102-M (herein collectively referred to as callers or calling devices 102 and individually as caller or calling device 102-x), terminations 104-1 through 104-N (herein collectively referred to as terminations or terminating devices 104 and individually as termination or terminating device 1 04-x), and a communication network 106.

Calling device 102-x may include a device that is capable of establishing and conducting a communication session with another device. Although calling device 102-x is shown as a phone in FIG. 1, calling device 102-x may include other types of communication devices, such as a personal computer, a laptop, a personal digital assistant (PDA), a cell phone, etc. In such implementations, the caller may use calling device 102-x to initiate a SIP session (e.g., an instant messaging session, a VoIP session, a multi-media communication session, etc.), or any other type of communication session.

Termination 104-x may include a device that is capable of servicing and/or handling calls. In one implementation, a person may be associated with termination 104-x and may interact with a caller.

Communication network 106 may include an intranet, a local area network (LAN), a wireless LAN (WLAN), a wide area network (WAN), a personal area network (PAN), a wireless PAN, a home-based network, the Internet, a cellular network, a public switched telephone network (PSTN), or a combination of networks. Communication network 106 may include an Internet Protocol (IP) network as well as other types of network (e.g., Signal System #7 network).

As further shown in FIG. 1, communication network 106 may include an interactive session routing system (ISRS) 108, middleware device 110, data access point (DAP) 112, and database device 114. Depending on the implementation, communication network 106 may include fewer, additional, or different devices than those illustrated in FIG. 1. For example, communication network 106 may include additional middleware devices. In other implementations, functionalities of middleware device 110, DAP 112, and/or database device 114 may be hosted in or performed by fewer devices (e.g., one device) than those illustrated in FIG. 1.

ISRS 108 may receive one or more calls from calling devices 102. ISRS 108 may be implemented as an interactive/intelligent voice response (IVR) system that may guide callers through menus (e.g., a calling plan), provide information, park calls, and/or extend calls to terminations 104. Alternatively, ISRS 108 may be implemented as a proxy server that monitors SIP sessions/calls.

In one implementation, when ISRS 108 receives a call and a request from calling device 102-x to extend the call to termination 104-x, ISRS 108 may consult DAP 112 to obtain information that is related to termination 104-x (e.g., whether calls are being queued). Based on the information, ISRS 108 may park and/or direct the call to termination 104-x. In addition, ISRS 108 may provide, via middleware device 110, the status of the call to a database on database device 114.

If the call is parked, ISRS 108 may periodically evaluate whether the call can be un-parked (e.g., forwarded to a destination) based on information that middleware (e.g., a web server, components on an application server (e.g., Enterprise JavaBeans™), a transaction manager, etc.) on middleware device 110 retrieves from a database on database device 114. Depending on the implementation, ISRS 108 may obtain the information from the middleware in one of several ways. For example, in one implementation, ISRS 108 may include a listener that receives messages from the middleware over a particular communication protocol (e.g., Simple Object Access Protocol (SOAP)). In another implementation, ISRS 108 may actively poll the middleware, which, in turn, may retrieve the information from the database.

If ISRS 108 is able to un-park the call based on the information or detects a parked call that is abandoned, ISRS 108 may update the database, via the middleware, with information that is related to the un-parked/abandoned call.

Middleware device 110 may host middleware that may act as an intermediary (e.g., an interface) between a database on database device 114 and a client of the database (e.g., a software application that is hosted on ISRS 108, DAP 112, etc.).

DAP 112 may provide information about terminations to ISRS 108. When ISRS 108 provides DAP 112 with an identifier that results from a call (e.g., a menu selection number based on a Dual-Tone Multi-Frequency (DTMF) signal from the caller or an Automatic Speech Recognition (ASR) signal), DAP 112 may resolve the identifier to one or more specific terminations. In addition, depending on the implementation, DAP 112 may query the database about the terminations. When the database responds, DAP 112 may relay the response to ISRS 108. Based on the response, ISRS 108 may decide whether the call can be parked or extended to one of the terminations.

Database device 114 may host a database identifying calls that are parked at ISRS 108 and calls that are extended to terminations 104. The database (also referred to as database 114) may provide information in response to queries about terminations 104/calls from DAP 112 or from middleware device 110. Database 114 may be updated when the middleware provides database 114 with information that is related to terminations 104/calls.

Figure 2:
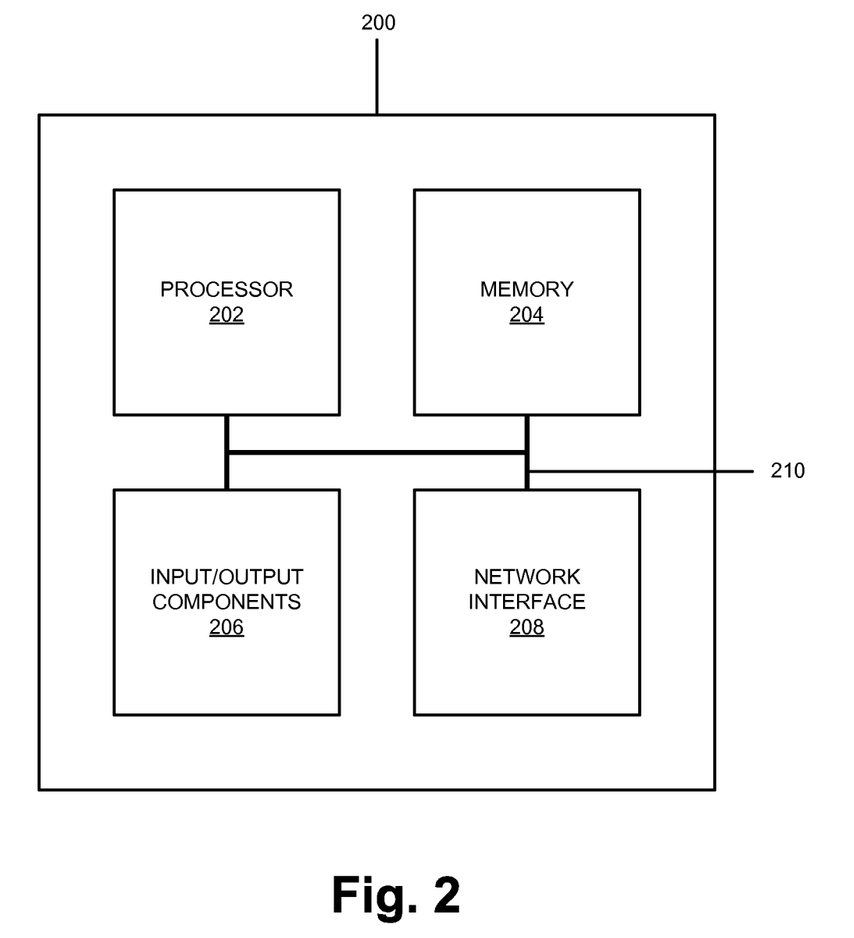
FIG. 2 is a block diagram of exemplary devices in FIG. 1.

FIG. 2 is a block diagram of a network device 200, which may correspond to middleware device 110, data access point 112, and/or database device 114. As shown, network device 200 may include a processor 202, a memory 204, input/output components 206, a network interface 208, and a communication path 210. In different implementations, network device 200 may include additional, fewer, or different components than the ones illustrated in FIG. 2. For example, network device 200 may include additional line interfaces, such as interfaces for receiving and forwarding data.

Processor 202 may include a processor, a microprocessor, an Application Specific Integrated Circuit (ASIC), a Field Programmable Gate Array (FPGA), and/or other processing logic capable of controlling network device 200. Memory 204 may include static memory, such as read only memory (ROM), and/or dynamic memory, such as random access memory (RAM), or onboard cache, for storing data and machine-readable instructions. Memory 204 may also include storage devices, such as a floppy disk, CD ROM, CD read/write (R/W) disc, and/or flash memory, as well as other types of storage devices.

Input/output components 206 may include a display screen, a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 200.

Network interface 208 may include any transceiver-like mechanism that enables network device 200 to communicate with other devices and/or systems. For example, network interface 208 may include mechanisms for communicating via a network, such as the Internet, a terrestrial wireless network (e.g., a WLAN), a satellite-based network, a WPAN, etc. Additionally or alternatively, network interface 208 may include a modem, an Ethernet interface to a LAN, and/or an interface/connection for connecting network device 200 to other devices (e.g., a Bluetooth interface).

Communication path 210 may provide an interface through which components of network device 200 can communicate with one another.

Figure 3:
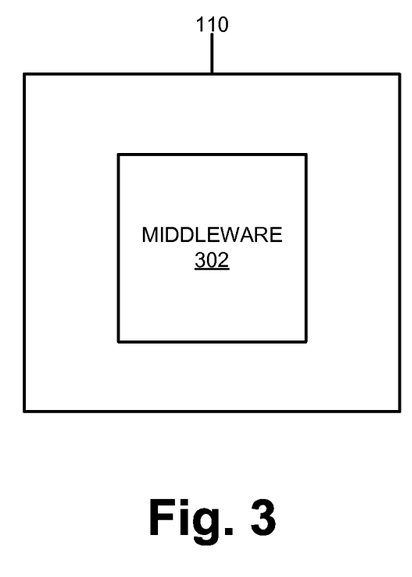
FIG. 3 is a block diagram of an exemplary middleware device of FIG. 1.

FIG. 3 is a functional block diagram of middleware device 110. As shown, middleware device 110 may include middleware 302. Depending on the implementation, middleware device 110 may include additional components, such as components in network device 200, an operating system (e.g., Virtual Memory System (VMS), Linux, Windows, etc.), and application, etc.

Middleware 302 may include hardware and/or software component for relaying information or a request from a client (e.g., a browser, a database client, ISRS 108, DAP 112, etc.) to a database (e.g., database 114) and for relaying a response from the database to the client. Depending on the implementation, middleware 302 may include a web server, an application server, a transaction manager, and/or any other type of application that may operate as an intermediary between a client application and a database.

In one implementation, middleware 302 may interact with DAP 112, ISRS 108, and/or database 114. For example, when DAP 112 queries middleware about the status of termination 104-x, middleware 302 may obtain the status information from database 114, and relay the status information to DAP 112. In another example, middleware 302 may fetch information related to calls (e.g., number of calls that are parked) from database 114 and relay the information to ISRS 108. In yet another example, ISRS 108 may send new information about the calls to middleware 302. In such an instance, middleware 302 may use the information to update database 114.

In a different example, middleware 302 may relay information to a customer who wishes to view real time data about different terminations 104 and/or calls. Middleware 302 may provide a web interface for the customer to access information about the terminations 104 and/or calls from database 114.

Figure 4A:
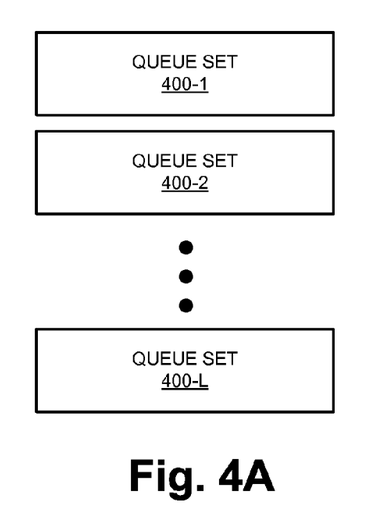
FIG. 4A is a functional block diagram of an exemplary database on a database device of FIG. 1.

FIG. 4A is a functional block diagram of an exemplary database 114 that is hosted on database device 114. As shown, database 114 may include queue sets 400-1 through 400-L (herein collectively referred to as queue sets 400 and individually as queue set 400-x). Depending on the implementation, database device 114 may include additional components, such as the components in network device 200, an operating system (e.g., Virtual Memory System (VMS), Linux, Windows, etc.), an application (e.g., an email client), other databases, etc.

Figure 4B:
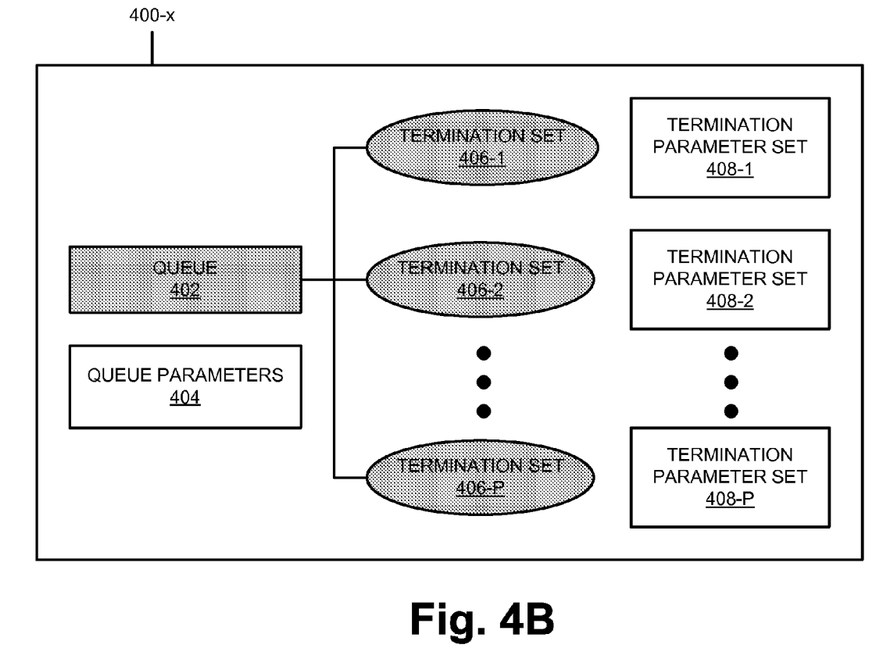
FIG. 4B is a block diagram of an exemplary queue set of FIG. 4A.

Queue set 400-x may include information about terminations 104 and calls that are parked at ISRS 108. FIG. 4B is a functional block diagram of queue set 400-x. As shown, queue set 400-x may include a queue 402, queue parameters 404, termination sets 406-1 through 406-P (herein collectively referred to as termination sets 406 and individually as termination set 406-x), termination parameter sets 408-1 through 408-P (herein collectively referred to as termination parameter sets 408 and individually as termination parameter set 408-x).

Queue 402 may include a list of calls that are parked at a particular location (e.g., a call extension point) in a decision tree (e.g., a menu system, a call plan, etc.) on ISRS 108. For example, if ISRS 108 receives calls, interacts with the calls in accordance with a Next Generation Service Network (NGSN) call plan, and parks the calls at a call extension point in the NGSN plan, queue 402 that corresponds to the call extension point may include a list of the parked calls. Queue parameters 404 may include parameters that characterize queue 402. Queue parameters 404 will be described below in greater detail.

Termination set 406-x may correspond to a particular termination 104-x, and may include fields, a table, and/or a list of calls that are routed to termination 104-x. Termination parameter set 408-x may include parameters that characterize termination set 406-x. Termination parameter set 408-x will be described below in greater detail.

Figure 5A:
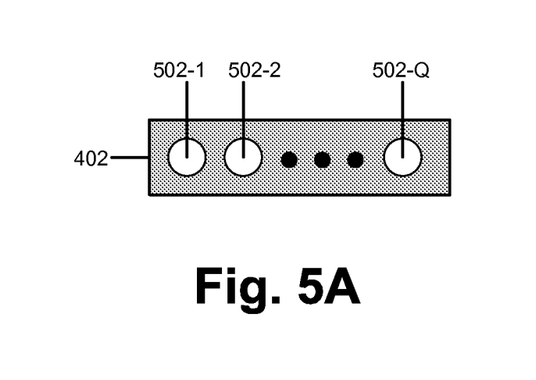
FIG. 5A is a block diagram of an exemplary queue of FIG. 4B.

FIG. 5A is a detailed block diagram of queue 402. As shown, queue 402 may include a list or a table of call identifiers 502-1 through 502-Q (herein collectively referred to as call identifiers 502 and individually as a call identifier 502-x). Call identifier 502-x may correspond to a call that is received and parked at ISRS 108. In one implementation, call identifier 502-x may be allocated from dynamic memory (e.g., free store, or unallocated memory) or parceled from pre-allocated memory when the corresponding call is received or parked at ISRS 108. Call identifier 502-x may be deleted or destroyed and/or returned to the free store/pre-allocated memory when the corresponding call ends or is abandoned.

Figure 5B:
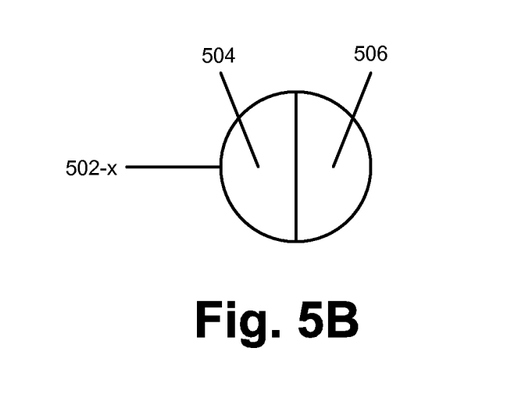
FIG. 5B is a block diagram of an exemplary call identifier of FIG. 5A.

As further shown in FIG. 5B, call identifier 502-x may include a queue index 504 and an identifier 506 that is associated with a call or calling device 102-x. Depending on the implementation, call identifier 502-x may include other types of information, such as the time of arrival of the corresponding call, a phone number, etc.

Queue index 504 may include a number that is assigned to call identifier 502-x when call identifier 502-x is placed in queue 402. Consequently, queue index 504 of each new call identifier 502-x may increase as new call identifiers 502 are added to queue 402. The number of call identifiers 502 in queue 402 may be found based on queue indices as follows:

$$\text{Number of call identifiers} = Q_{FIRST} - Q_{LAST} + 1. \quad (1)$$

In FIG. 5A, $Q_{FIRST}$ is queue index 504 of call identifier 502-1 and $Q_{LAST}$ is queue index 504 of call identifier 502-Q.

Identifier 506 may identify calling device 102-x and/or the corresponding call, and may possibly include an automatic number identification (ANI), a calling line identification (CLI), a telephone number, etc.

During operation of database 114, queue 402 may increase or decrease in size. For example, database 114 may insert call identifier 502-x at the front of queue 402 when database 114 receives a notification from ISRS 108, via middleware 302, that a call has been parked. Consequently, call identifiers 502 in queue 402 may be arranged in the order that the corresponding calls are parked at ISRS 108. In another example, database 114 may remove last call identifier 502-Q from queue 402 when ISRS 108 un-parks the corresponding call (e.g., ISRS 108 routes, redirects, or extends the call to available termination 104-x) that is associated with call identifier 502-Q. In yet another example, database 114 may delete call identifier 502-x from queue 402 when a caller abandons or drops the call that corresponds to call identifier 502-x.

Figure 5C:
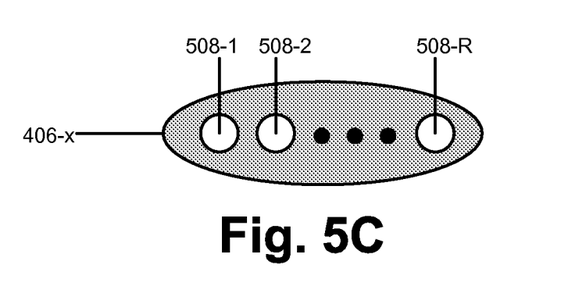
FIG. 5C is a block diagram of an exemplary termination set of FIG. 4B.

FIG. 5C schematically illustrates a diagram of termination set 406-x. As shown, termination set 406-x may include a list of call identifiers 508-1 through 508-R (herein collectively referred to as call identifiers 508 and individually as call identifier 508-x) that correspond to calls that have been extended to termination 104-x from ISRS 108.

During operation, termination set 406-x may increase or decrease in size. For example, the database may on database device 114 transfer call identifier 502-Q (which corresponds to a parked call at ISRS 108) from queue 402 to termination set 406-x when ISRS 108 notifies the database that the parked call is un-parked and is extended to termination 104-x. ISRS 108 may extend the call if termination 104-x has the capacity to handle the parked call (e.g. termination 104-x finishes handling a different call). In another example, database 114 may remove call identifier 508-x from termination set 406-x when ISRS 108 notifies database 114 that a caller has ended and/or abandoned the corresponding call.

Figure 6A:
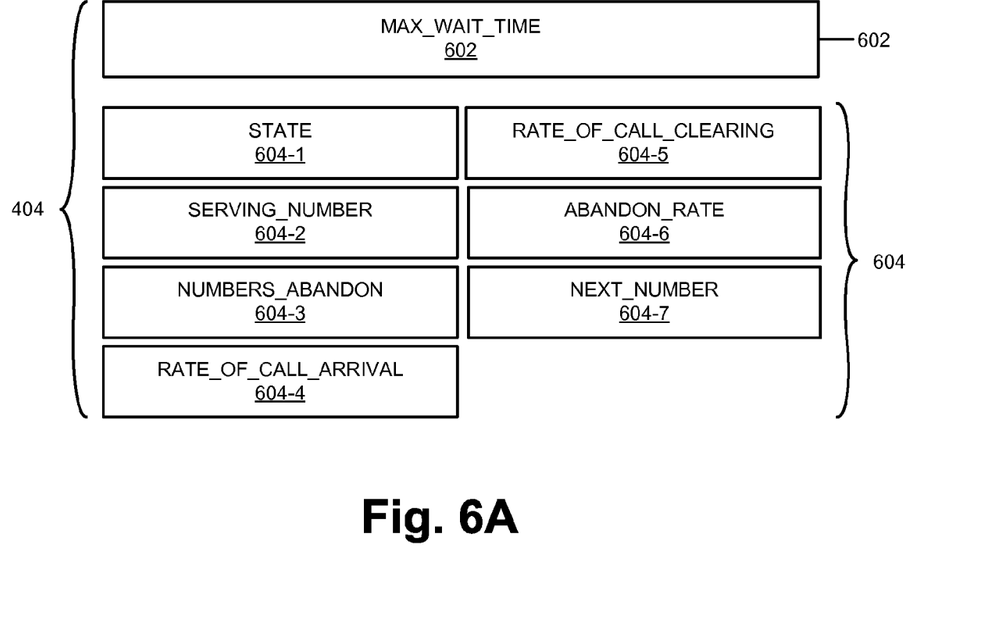
FIG. 6A is a block diagram of exemplary queue parameters of FIG. 4B.

FIG. 6A is a block diagram of queue parameters 404. As shown, queue parameters 404 may include a static parameter MAX_WAIT_TIME 602, which may be set when queue 402 is created and/or configured, and dynamic parameters 604, which may be updated based on information from ISRS 108. As further shown, dynamic parameters 604 may include a STATE 604-1, a SERVING_NUMBER 604-2, a NUMBERS_ABANDON 604-3, a RATE_OF_CALL_ARRIVAL 604-4, a RATE_OF_CALL_CLEARING 604-5, an ABANDON_RATE 604-6, and a NEXT_NUMBER 604-7. Depending on the implementation, queue parameters 404 may include additional, fewer, or different parameters than those illustrated in FIG. 6A.

MAX_WAIT_TIME 602 may indicate the maximum amount of time that a call may be parked at ISRS 108. If the call has been parked for longer than MAX_WAIT_TIME 602, or the call's expected wait time, which may be determined based on other parameters as explained below, is longer than MAX_WAIT_TIME 602, ISRS 108 may provide a special handling for the call (e.g., permit the caller to leave a voice mail, provide a callback service, allow the call to remain parked, drop the call, etc.).

STATE 604-1 may indicate whether queue 402 is currently accepting call identifiers 602-x. SERVING_NUMBER 604-2 may indicate queue index 504 of a call identifier 502-x that corresponds to a call being un-parked.

NUMBERS_ABANDON 604-3 may include a list of queue indices 504 of call identifiers 502 that have been deleted from queue 402 due to abandonment of the corresponding calls. RATE_OF_CALL_ARRIVAL 604-4 may indicate a moving average of the rate at which call identifiers 502 are being inserted into queue 402. RATE_OF_CALL_CLEARING 604-5 may indicate a moving average of the rate at which call identifiers 502 are exiting queue 402 and entering termination sets 406. ABANDON_RATE 604-6 may include a moving average of the rate at which call identifiers 502 are being deleted from queue 402 due to abandonment of the corresponding calls at ISRS 108. NEXT_NUMBER 604-7 may include the number that is to be assigned as queue index 504 to a new call identifier.

Figure 6B:
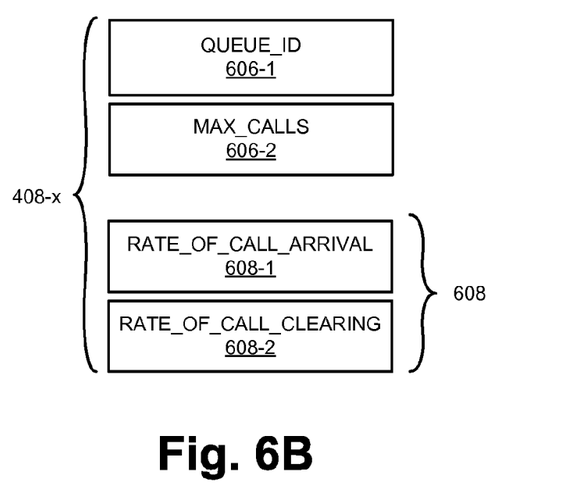
FIG. 6B is a block diagram of an exemplary termination parameter set of FIG. 4B.

FIG. 6B is a block diagram of termination parameter set 408-x. As shown, termination parameter set 408-x may include static parameters QUEUE_ID 606-1 and MAX_CALLS 606-2, both of which may be set when termination set 408-x is created and/or configured, and dynamic parameters 608, which may be updated based on information from ISRS 108. As further shown, dynamic parameters 608 may include a STATE_OF_CALL_ARRIVAL 608-1 and a RATE_OF_CALL_CLEARING 608-2. Depending on the implementation, terminations parameter set 408-x may include additional, fewer, or different parameters than those illustrated in FIG. 6B. For example, termination parameters set 408-x may include an identifier that associates termination set 406-x with a particular termination 104-x.

QUEUE_ID 606-1 may include an identifier of or a reference to queue 402 that is associated with termination set 406-x. As shown in FIG. 4B, because queue 402 is associated with termination sets 406, each of termination parameter sets 408 may include an identifier of queue 402 or a reference to queue 402, as QUEUE_ID 606-1.

MAX_CALLS 606-2 may indicate the maximum number of calls that termination 104-x may handle concurrently. In some implementations, different values of MAX_CALLS 606-2 may be scheduled, such that MAX_CALLS 606-2 may vary with time. In such cases, ISRS 108 may forward an appropriate level of traffic to termination 104-x at different times (e.g., time of day, day of the week, day of the month, etc.) to accommodate time-dependent characteristics of termination 104-x (e.g., varying staff level, hours-of-operation, etc.).

RATE_OF_CALL_ARRIVAL 608-1 may indicate a moving average of the rate at which calls are being received at termination set 406-x from queue 402. RATE_OF_CALL_CLEARING 608-2 may indicate a moving average of the rate at which calls are being concluded and/or abandoned at termination 104-x.

Figure 7:
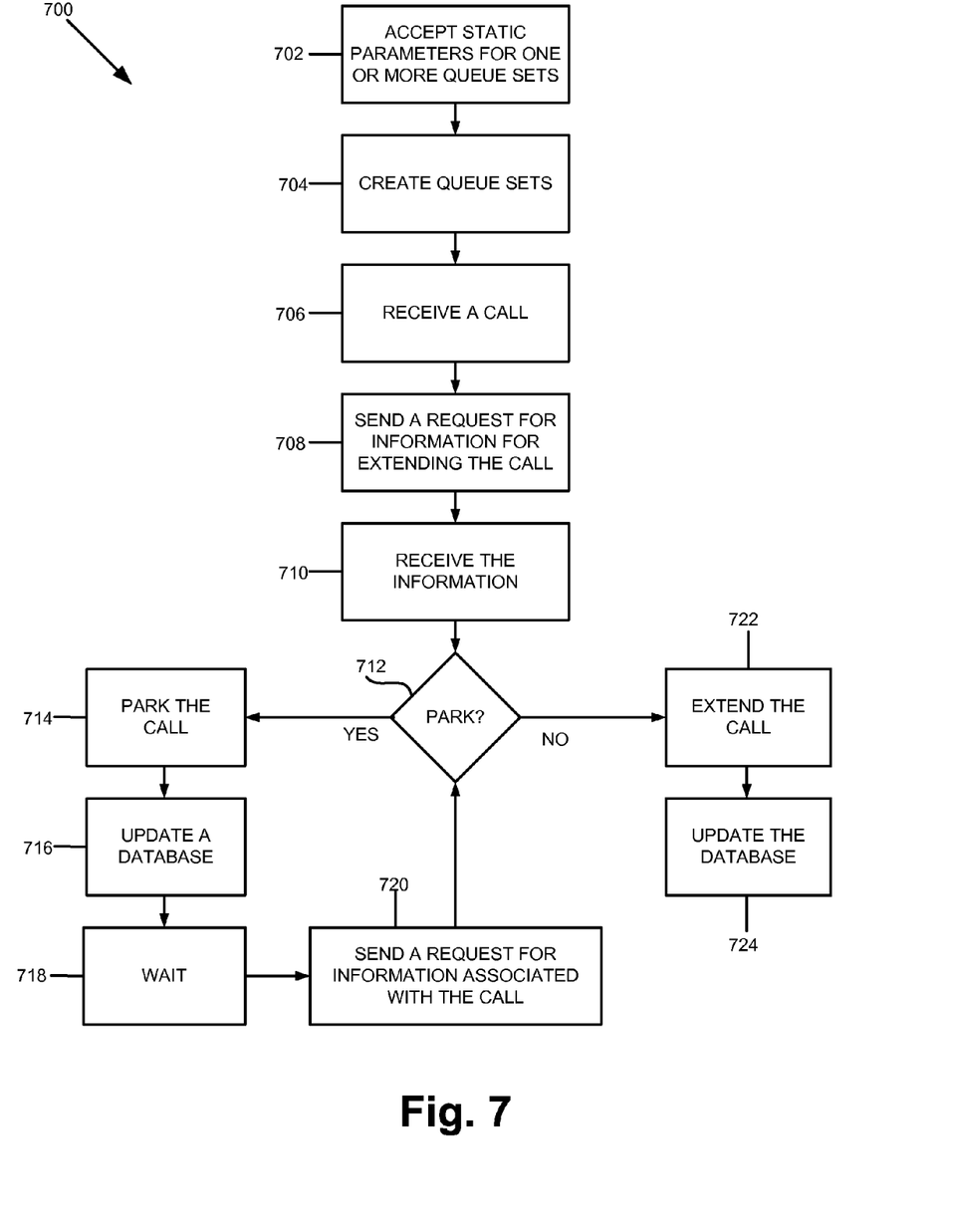
FIG. 7 is a flow diagram of an exemplary process for the devices of FIG. 1.

The above paragraphs describe system elements that are related to devices and/or components for parking and/or routing network calls and/or sessions. FIG. 7 is a flow diagram of a process 700 that is capable of being performed by one or more of these devices and/or components (e.g., ISRS 108, the database on database device 114, middleware 302, etc.).

As shown in FIG. 7, process 700 may begin at block 702, where static parameters (e.g., MAX_WAIT_TIME 602, MAX_CALLS 606-2, etc.) for one or more queue sets 400 may be accepted (block 702). In one implementation, the static parameters may be received at database device 114 via an interface (e.g., a web interface) for configuring queue sets 400. For example, personnel (e.g., a customer) associated with managing the IVR system via an interface may set up various static parameters which will govern how the IVR system processes calls. Some parameters, such as MAX_CALLS 606-2, may be scheduled, such that MAX_CALLS 606-2 may vary with time.

In some instances, additional parameters, such as an identifier for each of terminations 104 that correspond to termination sets 406, may be received at database 114. During the configuration, based on the inputted parameters, a queue set 400-x may be created for each call extension point (e.g., a point in a NGSN call plan or a menu system where an incoming call may be routed or extended to termination 104-x). A termination set 406-x may be created for each termination 104-x to which a call at the call extension point can be extended (FIG. 4B). By providing termination set 406-x with an identifier that is associated with a particular termination 104-x, termination set 406-x can be made to correspond to particular termination 104-x.

Queue sets 400 may be created (block 704). For example, database 114 may instantiate queue sets 400 to track calls that are parked and/or routed to terminations 104.

A call may be received (block 706). In one implementation, the call may be received at ISRS 108. If another component or device (not shown) in network 106 receives the call, the call may be routed to ISRS 108. In addition, ISRS 108 may interact the caller in accordance with a call plan (e.g., NGSN call plan, a voice activated menu system, etc.). Eventually, the call may reach a call extension point.

A request for information for extending the call may be sent (block 708). In one implementation, at the call extension point, ISRS 108 may send the request for information to DAP 112. In turn, DAP 112 may resolve the request, which may include an identifier (e.g., a phone number, an identifier for the call extension point, etc.), to one or more terminations 104.

Based on the identities of the terminations, DAP 112 may query database 114 about queue 402 that is associated with the terminations. In response to the query, database 114 may return the values of queue parameters 404 (e.g., values of STATE 604-1, SERVING_NUMBER 604-2, NUMBERS_ABANDON 604-3, etc.), which DAP 112 may relay to ISRS 108.

In a different implementation, ISRS 108 may receive the information about terminations from DAP 112, and launch a request to middleware 302 that relays the values of queue parameters 404 from database 114 to ISRS 108. The information for extending the call may be received (block 710).

It may be determined whether the call may be parked (block 712). In one implementation, ISRS 108 may determine whether the call may be parked when ISRS 108 receives the values of queue parameters 404. For example, if the value of STATE 604-1 is "NOT PARK," and/or the value of SERVING_NUMBER 604-2 is less than or equal to that queue index 504 of the call, ISRS 108 may decide to park the call.

If it is determined that the call is to be parked, process 700 may proceed to block 714, where the call may be parked (block 714). In parking the call, ISRS 108 may use queue parameters 404 to determine the length of time that ISRS 108 may wait until ISRS 108 checks whether the call can be extended/routed to one of terminations 104. For example, if the value of NEXT_NUMBER 604-7 is 65, the value of SERVING_NUMBER 604-2 is 21, and the value of RATE_OF_CALL_CLEARING 604-5 is 14.7 calls per minute, then the wait time may be given by $(65-21)/14.7 \approx 3$ minutes.

Database 114 may be updated (block 716). In one implementation, ISRS 108 may make a request to update database 114 via middleware 302. When ISRS 108 makes the request, ISRS 108 may also provide, to middleware 302, information, such as identifier 506 associated with the call. In turn, middleware 302 may make a request to update database 114 on behalf of ISRS 108, relaying the provided information. Based on the information, database 114 may allocate/instantiate call identifier 502-x that corresponds to the call and insert call identifier 502-x into queue 402.

At block 718, process 700 may wait (block 718). ISRS 108 may wait in accordance with the wait time determined at block 714.

After the waiting period has ended, a request for information associated with the call may be sent (block 720). For example, ISRS 108 may send a request, via middleware 302, to database 114 for the values of queue parameters 404. The returned values may be used at block 712 to determine whether the call may continue to be parked. For example, if the returned values indicates that termination 104-x that is associated with queue 402 is open to receive a call and queue index 504 is equal to the value of SERVING_NUMBER 604-2, ISRS 108 may determine that the call may be extended to termination 104-x.

Returning to block 712, if it is determined that the call is not to be parked, the call may be extended or routed to termination 104-x (block 722). In addition, information related to the extended call may be sent to database 114, via middleware 302.

Database 114 may be updated (block 724). For example, ISRS 108 may request database 114 to transfer call identifier 502-x that is associated with the call from queue 402 to termination set 406-x.

In the above description, in a loop that includes blocks 712 through 720, ISRS 108 may periodically query database 114 for information related to a call. In an alternative implementation, middleware 302 may notify ISRS 108 when middleware 302 updates database 114. For example, if a conclusion of a call at ISRS 108 results in a database update, middleware 302 may notify ISRS 108 about changes to termination set 406-x. In such an implementation, ISRS 108 may include a listener service that listens for messages from middleware 302.

The following example, with reference to FIGS. 8, 9A, 9B, 9C, and 9D, illustrates a process for parking and/or routing network calls and/or sessions. The example is consistent with exemplary process 700 described above with reference to FIG. 7.

Figure 8:
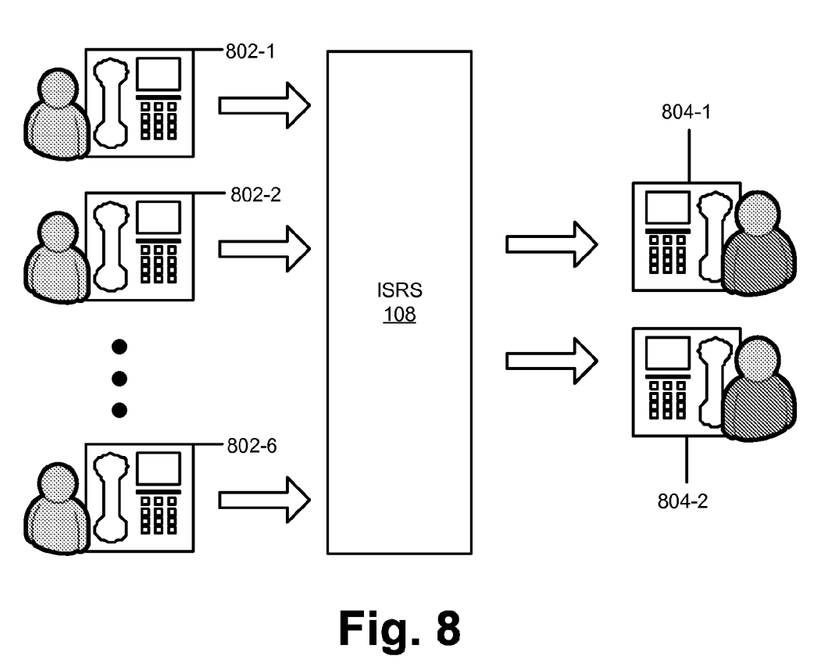
FIG. 8 illustrates telephone calls that are routed by an intelligent/interactive voice response system (IVR) to terminations.

For the example illustrated in FIG. 8, assume that callers 802-1 through 802-6 have placed calls that are routed to ISRS 108, and ISRS 108 guides the callers to a call extension point, and ISRS 108 parks and/or extends the calls at the call extension point. Assume that middleware 302 relays messages and/or information between ISRS 108 and a database (not shown in FIG. 8).

Figure 9A:
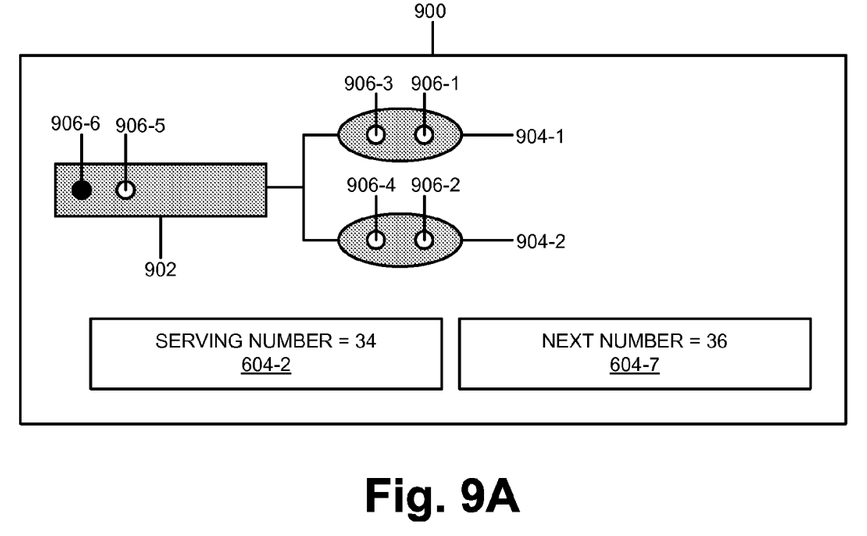
FIGS. 9A through 9D illustrate contents of an exemplary queue during a lifecycle of a telephone call.

In addition, assume that static parameters for queue set 400-x that corresponds to the call extension point are input via middleware 302 and are used to create queue set 900, which is illustrated in FIG. 9A. As shown, queue set 900 includes queue 902, termination set 904-1, which corresponds to termination 804-1, and termination set 904-2, which corresponds to termination 804-2. As further shown, termination set 904-1 includes call identifiers 906-1 and 906-3, and termination set 904-2 includes call identifiers 906-2 and 906-4. Queue 902 includes call identifier 906-5, which corresponds to a call made by caller 802-5. Assume that RATE_OF_CALL_CLEARING 604-5 for queue 902 is 0.25 calls per minute.

When caller 802-6 makes a call, the call is routed to ISRS 108. Caller 802-6 interacts with ISRS 108, which guides caller 802-6 through a call plan. At the call extension point, caller 802-6 generates a request for a call extension.

ISRS 108 generates a request to DAP 112 for information. DAP 112, upon the reception of the request, resolves a number associated with the call extension request to terminations 804-1 and 804-2, and returns identifiers that are associated with terminations 804-1 and 804-2.

ISRS 108 requests database 114 for information related to terminations 804-1 and 804-2, and, in response, database 114 returns parameter values for queue 902 and termination sets 904-1 and 904-2. Assuming that queue 902 is in a state that permits parking, ISRS 108 discovers that, based on the parameter values, terminations 804-1 and 804-2 are fully engaged in handling calls from callers 802-1 through 802-5.

Assume that ISRS 108 decides to park the call from caller 802-6. ISRS 108 allocates a call identifier 906-6 that corresponds to the call, and inserts call identifier 906-6 into queue 902. Assume that the value of NEXT_NUMBER 604-7 is 35, queue index 504 for call identifier 906-6 is set to 35, and an ANI of caller 802-6 is used as identifier 506 of call identifier 906-6.

After parking the call, ISRS 108 updates database 114. The result of updating database 114 is illustrated in FIG. 9A, with the values of SERVING$_{13}$ NUMBER 604-2 and NEXT$_{13}$ NUMBER 604-7 being equal to 34 and 36, respectively. ISRS 108 calculates the wait time based on the updated parameters. The wait time for the call is (35-34)/0.25 call=4 minutes.

While ISRS 108 waits, termination 804-2 concludes a call from caller 802-2. ISRS 108 sends a notification about the concluded call to database 114. Database 114 removes call identifier 906-2 from termination set 904-2.

In addition, ISRS 108 polls database 114. Based on information about termination set 904-2, ISRS 108 discovers that termination 804-2 may accept a parked call. ISRS 108 checks queue index 504 of call identifier 906-5, which is 34. Because queue index 504 is equal to the value of SERVING_NUMBER 604-2, ISRS 108 extends the call. Upon a notification of the call extension, database 114 transfers call identifier 906-5 from queue 902 to termination set 904-2.

Figure 9B:
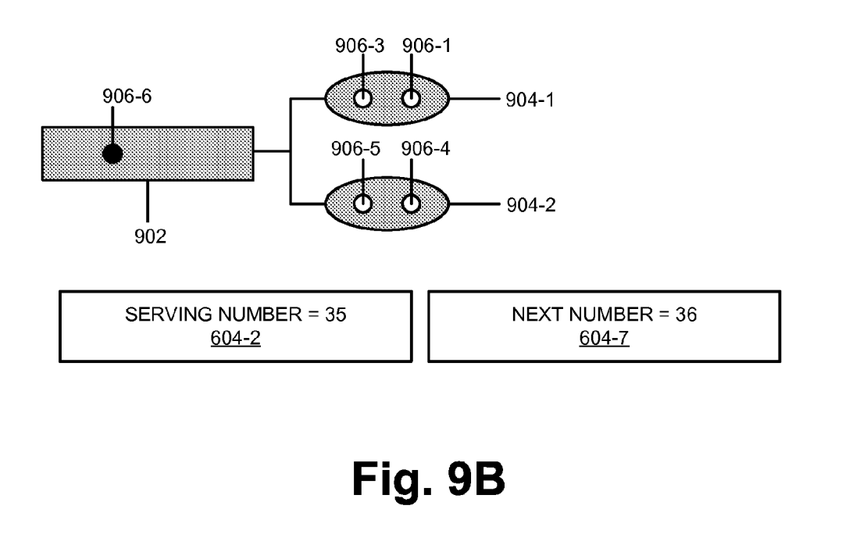

FIG. 9B depicts the configurations of queue 902 and termination sets 904-1 and 904-2 after database 114 is updated. As shown in FIG. 9B, queue 902 includes call identifier 906-6, termination set 904-1 includes call identifiers 906-3 and 906-1, and termination set 904-2 includes call identifiers 906-5 and 906-4.

Assume that callers 802-1, 802-3, and 802-5 subsequently conclude their calls. ISRS 108 notifies database 114 about the conclusions of the calls, and database 114 updates queue set 900.

When the wait time expires, ISRS 108 polls database 114. Database 114 returns the values of parameters that are associated with queue set 900. The values indicate that termination set 904-1 includes no call identifier, and that termination set 904-2 includes call identifier 906-4. ISRS 108 compares queue index 504 of call identifier 906-6, which is 35, to SERVING_NUMBER 604-2, which is 35. Since number 35 is equal or less than SERVING_NUMBER 604-2, ISRS 108 extends the call from caller 802-6 to termination 804-1, and updates database 114.

Figure 9C:
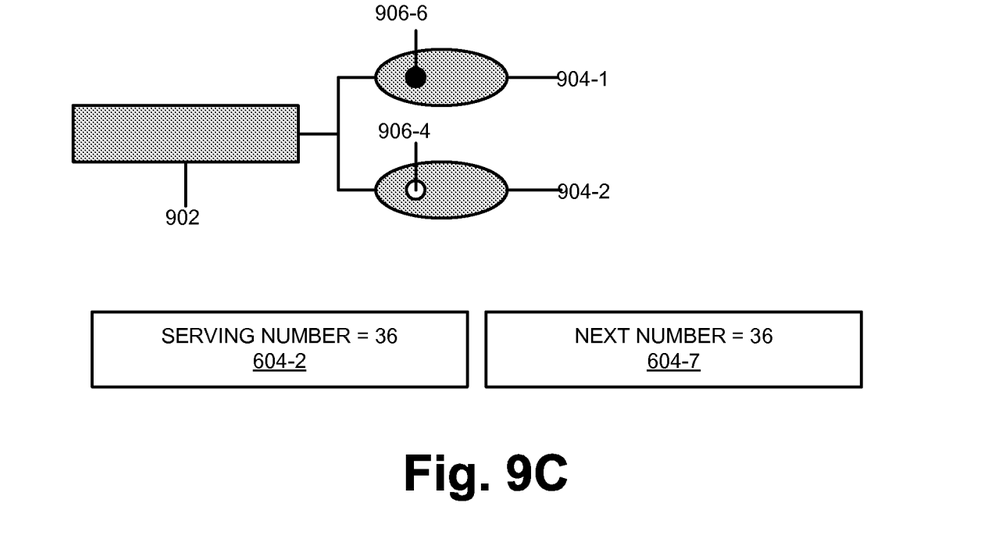

FIG. 9C shows the configurations of queue 902 and termination sets 904-1 and 904-2 after ISRS 108 updates database 114. As shown, queue 902 is empty, as call identifier 906-6 has been transferred from queue 902 to termination set 904-1. Termination set 904-2 includes call identifier 906-4, as the call from caller 802-4 is not yet concluded.

Figure 9D:
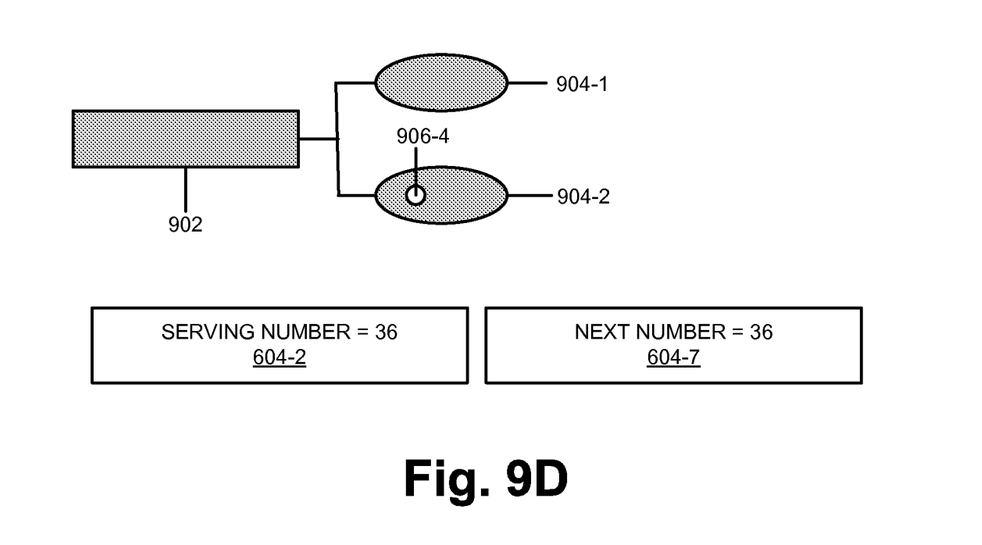

When the call from caller 802-6 ends, ISRS 108 updates database 114. FIG. 9D illustrates the resulting configuration of queue set 900 after database 114 is updated. In FIG. 9D, termination set 904-1 is empty since the call has concluded.

In the above example, a system may park calls and/or track calls at particular terminations. Depending on the number of calls that are being handled at each termination, the system may extend (i.e., connect callers to different endpoints) the parked calls to different terminations. Because the system tracks calls through many stages, ISRS 108 may control how and/or when a new call may be extended and/or parked. For example, through a client interface (e.g., a web interface), information about terminations and/or calls may be accessed displayed in real time.

The system may be scalable, as additional databases and/or middleware can be added to the system to handle increasing number of callers. In addition, the system may be easily integrated with a toll free system or an IVR order entry system.

The foregoing description of implementations provides illustration, but is not intended to be exhaustive or to limit the implementations to the precise form disclosed. Modifications and variations are possible in light of the above teachings or may be acquired from practice of the teachings.

For example, the system may include a unit that automatically generates a report and/or billing information based on information related to parking and/or extending calls. The report may include information that is related to calls (e.g., average call wait time), queues (e.g., a list of calls that have been parked for each queue 402, a list of calls that are in each queue 402, queue parameters 404), terminations (e.g., parameters in termination parameter set 408-x, a list of calls that are being handled at each of terminations 104, a list of calls that have been forwarded to terminations 104, etc.), or statistics based on the calls, queue parameters 404, and/or termination parameter set 408-x. The report may be distributed to interested parties (e.g., a system administrator, a customer (e.g., an entity that uses the system to handle calls from callers), etc.) via email, web posting/services, etc. In some implementations, the report may be generated in real-time, based on scheduling, on demand, or database updates.

In another example, while a series of blocks has been described with regard to an exemplary process illustrated in FIG. 7, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method performed by one or more devices, the method comprising:
   processing a call;
   receiving, at a call extension point, a request to extend the call to a terminating device corresponding to a multiple termination set;
   obtaining first parameter information indicating that each terminating device of the multiple termination set is handling other calls, and that a queue associated with the multiple termination set is accepting queue elements corresponding to parked calls at the call extension point;
   allocating a queue element representative of the call, and inserting the queue element into the queue, wherein the queue element is assigned a first queue index value based on the first parameter information;
   parking, responsive to the inserting, the call at the call extension point;
   extending the call to the terminating device responsive to second parameter information that indicates that the first queue index value is less than or equal to a second queue index value representative of a parked call to be unparked from the call extension point; and
   transferring, based on the extending, the queue element from the queue to the multiple termination set representative of the termination device,
   wherein the multiple termination set is allocated in a database in which the queue and queue element are allocated.

2. The method of claim 1, wherein processing a call includes:
   providing interactive responses to a caller; and
   guiding, responsive to the interactive responses, the caller through a call plan to the call extension point.

3. The method of claim 1, wherein obtaining the first parameter information includes:
   resolving the request based on a telephone number associated with the call to identify the terminating device.

4. The method of claim 3, wherein obtaining the first parameter information further includes:
   sending a request to middleware that relays the request to extend the call, to a database that provides the first parameter information.

5. The method of claim 1, where obtaining the first parameter information includes obtaining at least one of:
   a moving average of a rate at which the parked calls are being forwarded to terminating devices corresponding to the multiple termination set;
   a moving average of a rate at which the parked calls are being abandoned;
   a moving average of a rate at which queue elements representative of the parked calls are being inserted into the queue; or
   a moving average of a rate at which the parked calls are being forwarded to the terminating device.

6. The method of claim 1, further comprising:
   obtaining the second parameter information by listening for messages from middleware that provides the second parameter information.

7. The method of claim 1, wherein parking the call includes:
   determining an amount of time for which the call is to be parked.

8. The method of claim 1, further comprising:
   polling a database to retrieve the second parameter information to determine whether to unpark the call.

9. The method of claim 1, further comprising:
   detecting an abandoned call from the call extension point; and
   deleting a queue element that represents the abandoned call from the queue.

10. The method of claim 1, further comprising at least one of:
    generating a report that includes at least one of:
      a list of calls that have been parked or have been extended to terminating devices corresponding to the multiple termination set,
      a list of calls that are parked at the call extension point or that are being handled at terminating devices corresponding to the multiple termination set,
      parameters in a termination parameter set associated with the multiple termination set,
      queue parameters, or statistics based on at least one of:
the list of calls that have been parked,
the list of calls that are parked at the call extension point,
the parameters in the termination parameter set, or
the queue parameters; or
generating billing information based on a list of calls that have been parked or have been forwarded to terminating devices corresponding to the multiple termination set.

11. The method of claim 1, further comprising at least one of:
generating, with respect to the parking and the extending the call, a report based on a schedule; or
generating, with respect to the parking and the extending the call, a real-time report.

12. The method of claim 1, wherein obtaining first parameter information includes:
requesting the first parameter information to a web server that relays the request over Simple Object Access Protocol (SOAP).

13. A system comprising:
a database that includes queue sets;
middleware that relays information to and from the database;
a session routing system, configured to:
receive a request to redirect a session at a session redirection point;
identify a termination associated with the request;
send a query that identifies the termination to the database via the middleware;
obtain, based on a response from the database, first parameter information indicating that the termination is handling other calls, and that a queue associated with the queue set is accepting queue elements corresponding to parked calls at the session redirection point;
allocate a queue element, representative of the session, for insertion into the queue, wherein the queue element is assigned a first queue index value based on a response from the database,
park, responsive to the insertion, the session at the session redirection point;
redirect the session to the termination responsive to second parameter information that indicates that the first queue index value is less than or equal to a second queue index value representative of a parked call to be unparked from the session redirection point; and
transfer, based on the redirect, the queue element from the queue to a set representative of the termination,
wherein the set representative of the termination is allocated in a database in which the queue element and the queue are allocated.

14. The system of claim 13, where the session includes:
a telephone call;
a session initiation protocol (SIP) session;
a text messaging session; or
a multimedia communication session.

15. The system of claim 13, where the middleware includes:
a transaction manager.

16. The system of claim 13, where the session routing system includes:
an Internet Protocol (IP) gateway; or
an interactive voice response (IVR) system.

17. The system of claim 13, wherein the queue set includes:
one or more elements that represent different sessions parked at the session redirection point;
a set that represents the termination; and
one or more parameters that characterize the queue.

18. The system of claim 17, wherein each of the one or more elements includes:
a different number that identifies a different session or an endpoint of the different session.

19. A device comprising:
means for processing to a session until the session reaches a session extension point;
means for receiving first parameter information indicating that each terminating device of a multiple termination set is handling other sessions, and that a queue associated with the multiple termination set is accepting queue elements corresponding to parked sessions at the session extension point;
means for allocating a queue element representative of the session, and inserting the queue element into the queue, wherein the queue element is assigned a first queue index value based on the first parameter information;
means for parking, in response to the inserting, the session at the session extension point;
means for routing the session to an endpoint responsive to second parameter information which indicates that the first queue index value is less than or equal to a second queue index value representative of a parked call to be unparked from the session extension point; and
means for transferring, based on the routing, the queue element from the queue to the multiple termination set representative of the termination,
wherein the multiple termination set is allocated in a database in which the queue and the queue element allocated.

* * * * *